Feb. 15, 1966     E. J. FLEISSNER     3,235,657
COPYING APPARATUS WITH OPTICAL SCANNING
Filed June 13, 1962     4 Sheets-Sheet 1
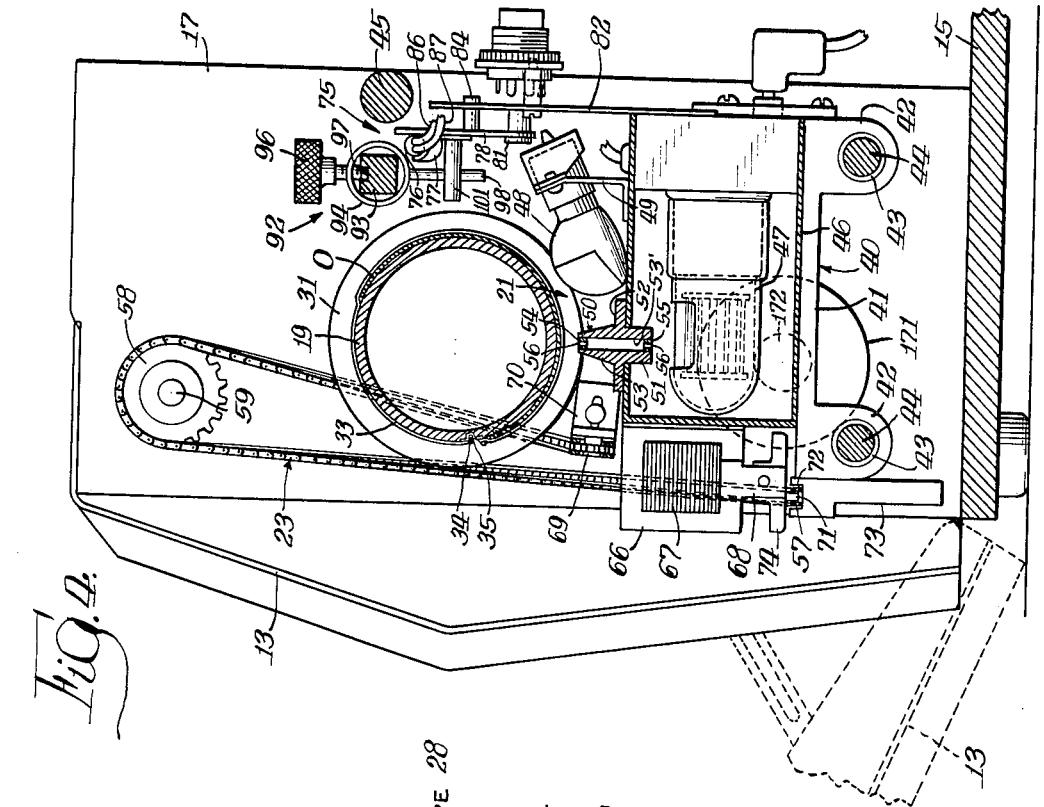
INVENTOR.
Edward J. Fleissner
BY
Hibben, Noyes & Bicknell
Atty's.

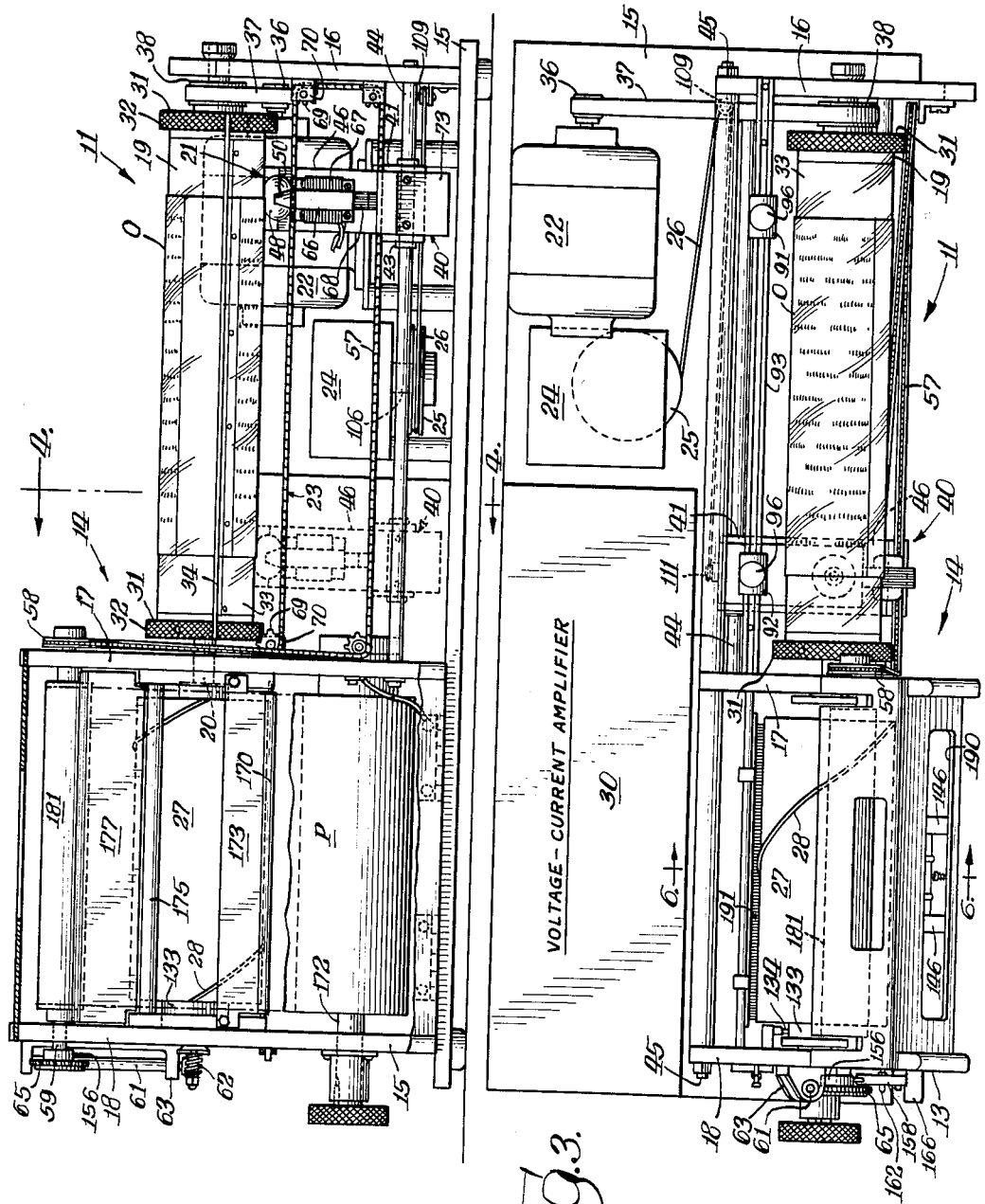

Feb. 15, 1966  E. J. FLEISSNER  3,235,657
COPYING APPARATUS WITH OPTICAL SCANNING
Filed June 13, 1962  4 Sheets-Sheet 3
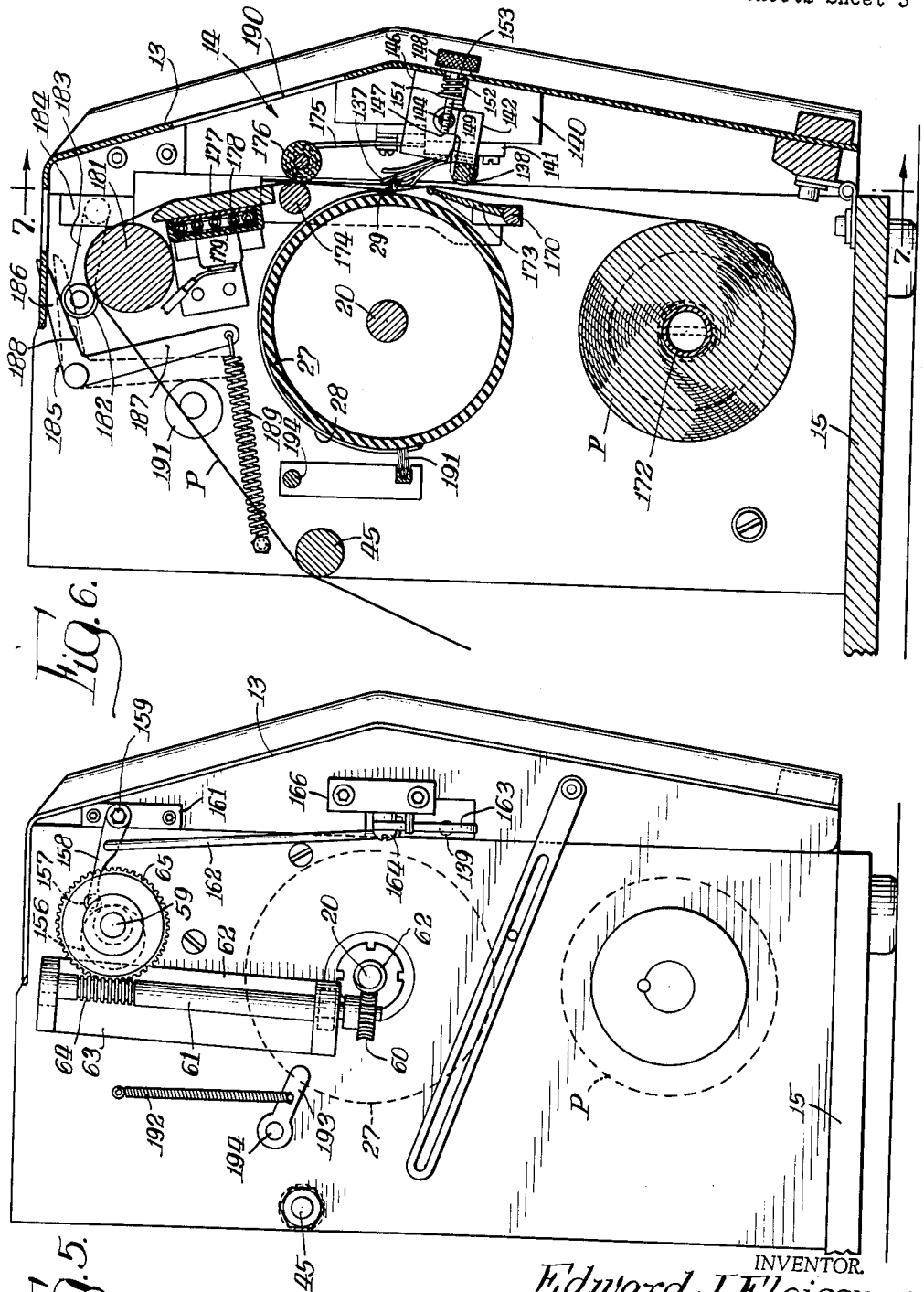
INVENTOR.
Edward J. Fleissner,
BY
Hibben, Noyes & Bicknell
Atty's.

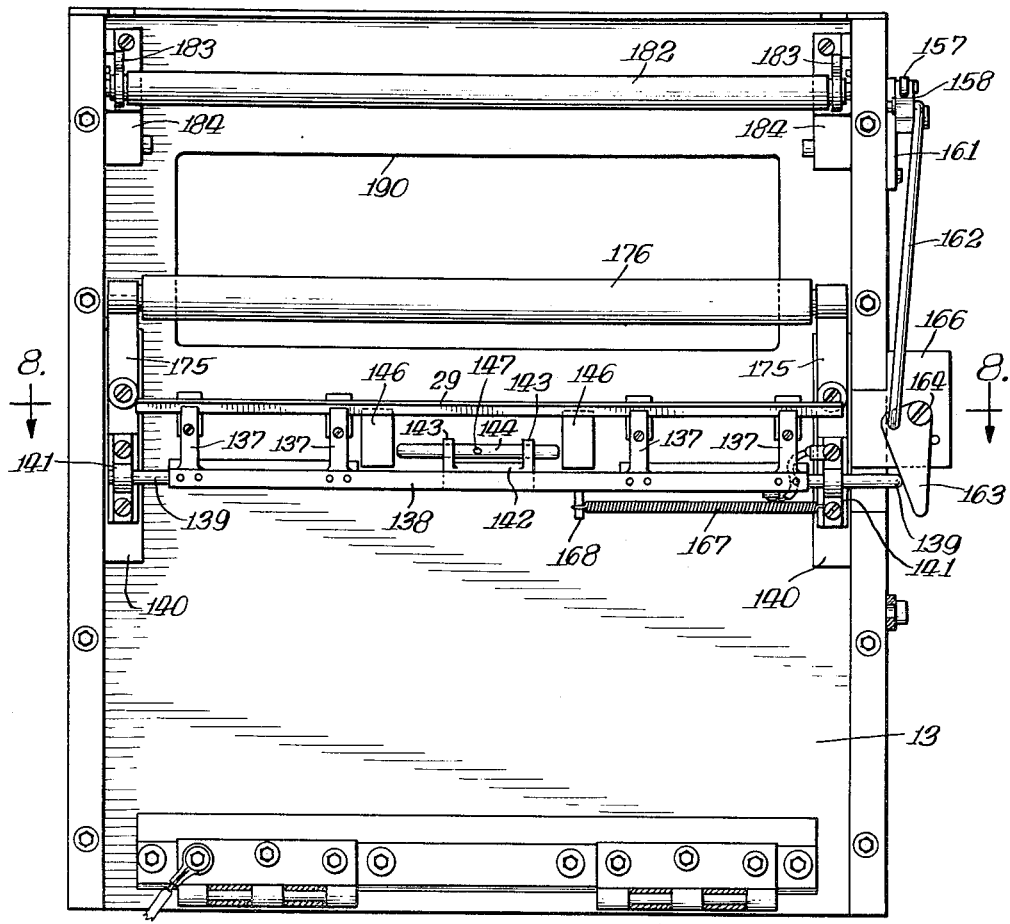
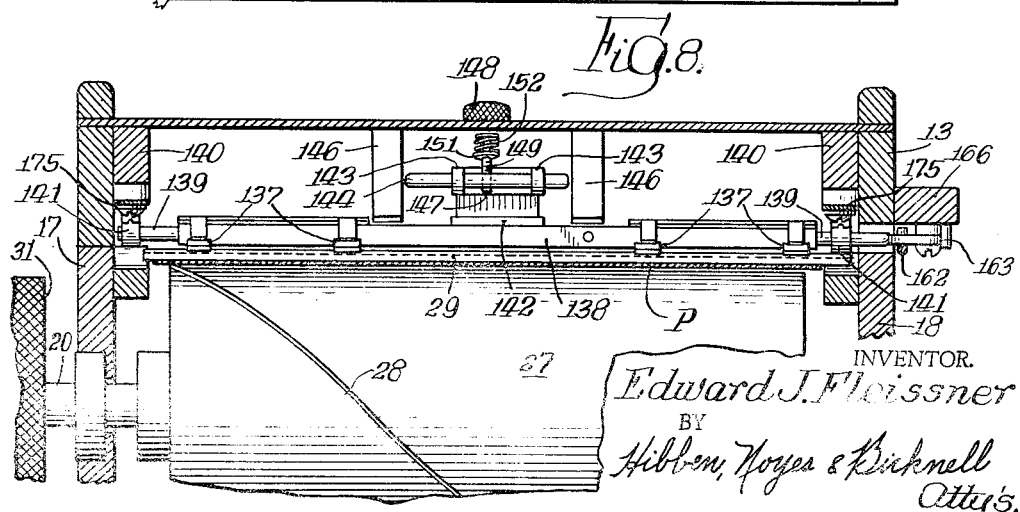

United States Patent Office 3,235,657
Patented Feb. 15, 1966

3,235,657
COPYING APPARATUS WITH OPTICAL
SCANNING
Edward J. Fleissner, Chicago, Ill., assignor, by mesne assignments, to Francis A. Callery, New York, N.Y.
Filed June 13, 1962, Ser. No. 202,185
15 Claims. (Cl. 178—6.6)

This invention relates to a copying apparatus, and more particularly to an electrolytic copying or facsimile apparatus having an improved scanner construction and conveyor therefor.

The present application is a continuation-in-part of my copending applications Serial No. 852,682, filed Nov. 13, 1959, and Serial No. 766,090, filed Oct. 8, 1958, now abandoned.

Accordingly, it is a general object of the present invention to provide a novel and improved electrolytic copying or facsimile apparatus.

A more particular object is to provide an improved conveyor and control for the scanner of a copying apparatus of the foregoing character.

A specific object is to provide an improved scanner for use in an electrolytic copying apparatus.

Another object is to provide an improved electrolytic copying apparatus that is of a simplified construction, economical to manufacture and maintain, and reliable in operation.

Other objects and advantages will become apparent upon making reference to the detailed description which follows and accompanying sheets of drawings, in which:

FIGURE 1 is a reduced perspective view of a copying apparatus embodying the features of the present invention;

FIGURE 2 is an enlarged front elevational view of the copying apparatus illustrated in FIG. 1 with portions of the enclosing housings removed to show the internal construction thereof;

FIGURE 3 is a top plan view of the apparatus shown in FIG. 2;

FIGURE 4 is an enlarged vertical sectional view, taken substantially along the line 4—4 of FIG. 2;

FIGURE 5 is an enlarged end elevational view of the left side of the apparatus shown in FIGS. 2 and 3;

FIGURE 6 is an enlarged sectional view taken substantially along the line 6—6 of FIG. 3;

FIGURE 7 is an elevational view of the inside of the cover of the reproducing portion of the apparatus taken substantially along the line 7—7 of FIG. 6;

FIGURE 8 is a fragmentary sectional view taken substantially along the line 8—8 of FIG. 7;

FIGURE 9 is a fragmentary front elevational view of a portion of the apparatus and showing a detail of the construction thereof; and FIGURE 10 is a semi-diagrammatic block diagram illustrating the various components of the photo-electrical system of the present apparatus.

Briefly described, the present invention contemplates an improved copying or facsimile apparatus employing a novel scanning means which eliminates the necessity of focusing lenses or reflectors. The scanning means to be hereinafter described includes a light-tight housing having a scanner in the form of generally tubular light trap in a wall thereof. The light trap is provided with a minute aperture at each end thereof for directing a ray of reflected light from material being copied to a light sensitive element, in this instance a photomultiplier tube, mounted in the housing and aligned with the openings. Because of the minuteness of the openings in the scanner, a precise image of an elemental area of the material to be copied and any indicia thereon, is transmitted to the photomultiplier tube. A highly accurate reproduction or facsimile of the material being copied is thus obtained.

In addition to the novel construction of the scanning means, the present invention further contemplates a novel conveyor for shifting the scanning means relative to the material being copied, such material in this instance being mounted on the periphery of a revolving drum. The conveyor also includes means for adjusting the extent of traverse of the scanner relative to the rotating drum, thereby providing economy of operation by eliminating scanning of blank or undesired areas of the material being copied. Such adjusting means, to be described more fully hereinafter, comprises a pair of adjustable stops mounted alongside the material carrying drum and movable longitudinally with respect to the drum. The stops are effective to actuate a switch carried by the scanner between different positions, the switch being effective when in one position to actuate the conveyor to cause the scanner to move in a direction for copying and when in another position to actuate a return means to move the scanner back to a position for making another copy.

The reproducing or recording portion of the present copying apparatus is conventional to the extent that signals of varying magnitude and in the form of electrical impulses from the photomultipler tube are amplified by a voltage-current amplifier and a resultant current is supplied to the reproducing or recording means. The reproducing means includes an electrode in the form of a helix wire carried on the circumference of a rotatable printing drum and another electrode in the form of an oscillating printing bar mounted adjacent the helix wire. A web of electrolytic or sensitized paper is continuously fed between the electrodes from a roll thereof to provide a copy of the material being scanned due to the electrochemical change caused by the current flow through the paper, as is well known.

Before proceeding with the detailed description of the present copying apparatus, a short general description thereof will be included. Thus, as seen in FIGURES 1, 2, and 3, the instant copying apparatus comprises a first housing 10 which encloses a scanning means and conveyor structure, indicated generally at 11 in FIGS. 2 and 3, and a second housing 12 having a door 13. The housing 12 encloses the reproducing or recording structure of the apparatus, indicated generally at 14 in FIGS. 2 and 3. The housings 10 and 12 are mounted on a common base plate 15, which also serves as a mounting for three laterally spaced upright plates, indicated at 16, 17, and 18 in FIGURES 2 and 3. The scanning and conveyor structure 11 is mounted between the plates 16 and 17 and the reproducing structure is mounted between the plates 17 and 18.

The structure 11 includes an elongated cylindrical scanning drum 19 secured to a rotatably mounted shaft 20 extending laterally through the plates 16, 17 and 18. The drum 19 is adapted to receive and retain material to be copied on its outer periphery, and scanning means, indicated generally at 21, is mounted alongside and below the drum 19 for generating signals in the form of electrical impulses from the material being copied as the scanning means traverses the drum 19. The conveyor for the scanning means 21 includes an electric motor 22 which serves to rotate the drum 19 and effect movement of an endless chain 23 for advancing the scanning means 21 from right to left as viewed in FIGS. 2 and 3 to provide a copy. Return means in the form of another electric motor 24, which serves to rotate a cable drum 25 having a cable 26 connected thereto and to the scanning means 21, is provided for shifting the latter from left to right along the drum 19 in preparation for another copying operation.

The reproducing or recording structure 14 includes a drum 27 mounted on the shaft 20 in end-to-end relation with the drum 19 and having an electrode in the form of a helix wire 28 carried around the circumference of the drum 27. A second electrode in the form of a laterally oscillating printing blade 29 (FIG. 7) is carried by the cover 13 for movement to a position adjacent the helix wire, and mechanism driven by the motor 24 is provided for advancing a web of sensitized material, in this instance electrolytic paper P, at a predetermined rate between the electrodes 28 and 29. A voltage-current amplifier 30, identified by legend in FIG. 3, receives electrical impulses from the scanning means 21 and translates such impulses into an electric current of varying intensity which flows between the electrodes 28 and 29 and thus through the sensitized paper to provide a facsimile copy. The path of the electrical impulses from the scanning means 21 through the voltage and current amplification stages of the amplifier 30, and the resultant current flow between the electrodes 28 and 29 are illustrated diagrammatically in FIG. 10.

Referring now to FIGURES 1–4, the details of the construction of the scanning means and conveyor structure 11 will now be described. Thus, the drum 19 is mounted on the shaft 20 in an elevated position above the base 15. The drum 19, in the present instance, is provided with a radially outwardly extending flange 31 at each end thereof. The flanges 31 facilitate manual rotation of the drum when a piece of material to be copied, such as sheet of paper O having indicia thereon to be copied, is mounted on the outer periphery of the drum 19. The outer circumferential surfaces of the flanges 31 may be roughened as by knurling 32 to facilitate manipulation of the drum 19.

In order to retain a piece of material to be copied in wrapped relation around the drum 19, a transparent sheet of plastic 33 is provided for receiving and holding the sheet of material to be copied in engagement with the drum. The plastic sheet 33 has one longitudinal edge secured to the surface of the drum and the opposite longitudinal edge of the sheet is provided with a bar or rod 34 (FIGS. 2 and 4) adapted to seat in a longitudinal groove 35 in the drum and end flanges 31. A sheet of material having indicia thereon to be copied, such as the sheet of paper O, is thus inserted under the plastic retaining sheet 33 with the indicia facing outwardly and the sheet is then wrapped around the drum 19 by manually rotating it. The bar 34 is thereafter seated in the groove 35 to maintain the plastic sheet 35 and the underlying sheet of material to be copied tightly wrapped around the drum 19. It will be understood that the length and diameter of the drum 19 may be varied to accommodate different sizes of material to be copied.

Rotation of the drum 19 is achieved by the electric motor 22, the output shaft of which is provided with a pulley 36 which drives a belt 37 trained around another pulley 38 secured to the drum shaft 20.

The scanning means 21 comprises a carriage 40 (FIG. 4) formed by an inverted U-shaped frame 41 extending transversely of the drum 19 and having depending flanges 42 provided with tubular bearing bushings 43. Elongated guides or rods 44 extend through the bushings 43 longitudinally of the drum 19 and are secured at their ends to the plates 16 and 17 for slidably supporting the carriage 40. Another rod 45 disposed rearwardly of the drum 19 and having tubular spacers thereon extends through the plates 16, 17 and 18 to rigidify the entire structure.

Mounted on the frame 41 is a generally rectangular-shaped light tight housing 46 within which a light sensitive element in the form of a photomultiplier tube 47 (FIG. 4) is mounted. The tube 47 is a conventional 931–A type and is adapted to provide signals in the form of electrical impulses of a magnitude which varies as a function of the intensity of a light source impinging on the tube. In the present instance, the light source is a reflected ray of light from an elemental area of the material O.

In order to provide the aforementioned ray of reflected light from the material being copied as the drum 19 is rotating, a novel scanner in the form of an apertured light trap 50, is provided. The scanner or light-trap 50 comprises a tubular member having a lower cylindrical portion 51 (FIG. 4) adapted to extend through an opening in the top wall of the housing 46, a generally centrally disposed annular radially outwardly extending flange 52, an upper inwardly tapering conical portion 53, and a central bore 53'. The flange 52 serves to locate the tubular member in the housing 46 and to exclude light, and the tapering portion 53 eliminates shadows on the area being scanned. Closure means in the form of a pair of plugs or inserts 54 and 55 are provided for respectively closing the upper and lower ends of the bore 53'. Each plug has a minute central opening 56 therethrough, the openings 56 being in substantial radial alignment with the longitudinal axis of the drum 19 and also in alignment with the photo-sensitive portion of the tube 47. The openings 56 may have a diameter ranging from about .005 to .015 inch, and, in the present instance, are about .010 inch in diameter. The latter size results in a scanned elemental area of about .010 square inch which corresponds to a resolution of approximately 100 lines per inch. The bore 53' of the light trap 50 has an internal diameter of at least about ten times the diameter of the openings 56, and in this instance is .75 inch. The length of the bore 53' is at least greater than one half of an inch, and in this instance is 1.125 inches. The bore 53' is preferably covered with a light absorbent material to prevent reflection and/or dispersion of the light passing through the scanner.

In order to assure adequate illumination of the under surface of the drum 19 and particularly the area thereof immediately above the scanner 50, a lamp 48 is supported in a bracket 49 (FIG. 4) mounted rearwardly or to the right end of the housing 46, as viewed in FIG. 4.

The foregoing construction employed in the scanning means 21 provides many advantages over the optical systems presently employed in facsimile copy machines. Because of the fact that most of the currently available facsimile copying machines employ a conventional photo-electric cell as the light sensitive element, it is necessary to provide one or more high intensity light sources and an elaborate lens system to concentrate the light on the area of the material being scanned. Such light concentration is necessary in order to provide a reflected beam of light from the material being copied of sufficient intensity to cause the photocell to emit an electrical impulse of sufficient magnitude to actuate related electronic equipment. To this end, such systems also employ additional lens to further concentrate and focus the reflected light on the photocell. Obviously, such machines are costly and heavy because of the lenses, reflectors, and related structure employed in the optical system, and are difficult to keep in adjustment.

The photosensitive element 47 of the present scanning means 21 is a photomultiplier tube, which, because of its increased sensitivity relative to a photocell, eliminates the necessity for a high intensity illumination system for the area scanned and a focusing system for the reflected light. Such sensitivity may be of the order 1 to 10 million times that of a photocell. The scanning means 21 utilizes this characteristic of the photomultiplier tube to advantage by employing a pair of aligned apertures 56 in the light trap or scanner 50 for directing a minute ray of reflected light from the material being copied onto the tube 47. The light source, in this instance the bulb 48, need only flood the area being scanned with light, and because of the sensitivity of the tube 47, the bulb 48 need only be of moderate wattage. Because of the minuteness of the openings 56 and the laws of optics, a very precise image of the area scanned is transmitted to the tube 47 throughout a range of locations of the scanner 50 relative to the drum 19. Thus, because the scanner 50 does not incorporate any lenses, the weight of such a structure is eliminated. The elimination of lenses also permits the scanner 50 to be made more compact than existing arrangements. Reduction in the size of the scanner 50 also permits an overall compacting and cost reduction of the entire apparatus.

The conveyor means for effecting longitudinal movement of the scanning means 21 relative to the drum 19 includes the chain 23, which is of the "ladder" type, and particularly a portion 57 thereof (FIGS. 2, 3, and 4) which extends longitudinally of the drum 19 and which is adapted to be selectively connected to the slidable carriage 40. The portion 57 of the chain 23 passes over a pair of adjustable idler sprockets 69 (FIGS. 2 and 4) which are movable forwardly and rearwardly in brackets 70 to permit adjustment of the tension of the chain. The chain 23 is driven by a sprocket 58 (FIGS. 2, 3, and 4) secured to the projecting end of a shaft 59 extending between the upper ends of the plates 17 and 18. The shaft 59 is driven by the shaft 20 through an intermediate gear reduction unit comprising a gear 60 (FIG. 5) carried at the lower end of a shaft 61 and meshed with a worm 62 at the outer end of the shaft 20. The shaft 61 is supported at its ends by a bracket 63 mounted on the outside of the plate 18 and the upper end of the shaft 61 is provided with a worm 64 which meshes with a pinion 65 secured to the shaft 59.

In order to permit selective connection of the carriage 40 to the portion 57 of the chain 23 to effect movement thereof longitudinally of the drum 19 from the outer or right end thereof toward the left end, as viewed in FIGS. 2 and 3, the scanning means 21 includes a solenoid 66 (FIGS. 2 and 4). The solenoid 66 in this instance is mounted on the front wall of the housing 46 and includes a winding 67 and an armature 68 which normally extends downwardly by gravity. A pin 71 secured to the lower end of the armature 68 is adapted to extend into an opening in a link of the ladder chain 23 to thus connect the chain to the carriage 40. In order to prevent disengagement of the chain from the armature 68 when the latter is extended, a longitudinal groove 72 is provided in the upper edge of a plate 73 secured to the front portion of the frame 41 for receiving the longitudinally extending portion 57 of the chain 23. The lower end of the armature 68 is provided with a laterally extending portion 74 which closely overlies the groove 72 to prevent disengagement of the portion 57.

Energization of the solenoid 66 is controlled by a switch 75 (FIGS. 4 and 9) mounted on the carriage 40. In the present instance, the switch 75 is of the mercury type and comprises a closed glass tube 76 secured by a bracket 77 to a triangular plate 78. The plate 78 is pivotally connected as by a rivet 81 to an upright plate 82 secured to the rear or right end of the scanner housing 46 (FIG. 4). The plate 82 includes an arcuate slot 83 into which a pin 84 carried by the pivot plate 78 extends.

The tube 76 of the switch 75 contains a quantity of mercury, indicated at 85, and a pair of spaced electrodes (not shown) within the tube are adapted to be closed by the mercury 85 when the pivot plate 78 is rocked to its dotted line position illustrated in FIG. 9 and opened when the plate 78 is rocked to its full line position. When the switch 75 is closed, current may flow through the switch and a pair of wires 86 and 87 connected to a circuit which includes the solenoid 66. Thus when the switch 75 is open, the solenoid 66 will be deenergized, and when the switch 75 is closed, the solenoid 66 is energized and the armature 68 and pin 71 are retracted, thereby disengaging the carriage 40 from the chain 23. Closing of the switch 75 may also perform additional functions, e.g. energization of the electric motor 24, and actuation of a counter mechanism (not shown) which indicates the number of copies made by the apparatus. A stepping cam (not shown) is mounted on the carriage 40 adjacent the solenoid 66 and is actuated by movements of the armature 68 to control the operation of the motor 22.

According to the present invention, a novel means is provided for effecting pivotal movement of the plate 78 and consequently opening and closing of the switch 75 to thus energize and deenergize the solenoid 66 in timed relation with the movement of the scanning means 21. Such means in the present instance comprises a pair of adjustable stops 91 and 92 (FIGS. 3, 4, and 9) mounted on a longitudinally extending bar or rod 93 which, in this instance, is rectangular in cross section and is secured at its ends to the plates 16 and 17. Each stop 91, 92 comprises a tubular collar 94 disposed around the bar 93 and having a thumb screw 96 threaded into the collar 94 and adapted to ride in a groove 97 in the top of the bar 93. A depending rod or stud 98 is also threaded into each collar 94 in general axial alignment with the threaded portion of the thumb screw 96, the studs 98 providing abutments for engaging a horizontally extending arm 101 carried by the pivot plate 78 (FIGS. 4 and 9). The arm 101 serves to rock the plate 78 between its respective limit positions illustrated in full and dotted lines in FIG. 9.

Thus, adjustment of the stop 91 along the bar 93 is effective to control the point at which the switch 75 is moved to its full line or open position illustrated in FIG. 9 thereby deenergizing the solenoid 66 and connecting the carriage 40 to the chain 23. With the carriage 40 connected to chain 23, the scanning means 21 will begin a longitudinal traverse of the rotating drum 19 in a direction from the outer or right end of the drum toward the inner or left end. The position at which such movement occurs is thus readily controlled by adjustment of the stop 91 and consequently this stop may be initially adjusted in accordance with the length of the sheet of material being copied, its position on the drum 19, or the position of the indicia on the sheet.

Assuming that the switch 75 and the pivot plate 78 are in the full line position illustrated in FIG. 9 and that the carriage 40 has completed a traverse of the material being copied, it is desirable to provide means for automatically and rapidly returning the scanning means 21 to its initial or starting position, as indicated in full lines in FIG. 2. Such means, in the present instance, comprises a return drive in the form of the electric motor 24, indicated diagrammatically in FIGS. 2 and 3, the cable drum 25, and cable 26. The electric motor 24 is mounted on the base 15 adjacent the motor 22 and the cable drum 25 is secured to the output shaft 106 thereof. The flexible cable 26 has one end secured to the drum 25, the remainder of the cable extending toward the plate 16 (FIG. 3) where it passes over an idler pulley 109 and thence extends longitudinally of the drum 19 to a connection 111 on the carriage 40.

Assuming that the solenoid 66 is energized, when the motor 24 is energized, the cable drum 25 will rotate in a clockwise direction as viewed in FIG. 3 to cause the cable 26 to be wound around the drum, thereby rapidly shifting the carriage 40 longitudinally on its supports 44 toward the outer or right end of the drum 19. Damage to the motor 24 is prevented when the carriage 40 is being moved by the motor 22 by the provision of a slipclutch (not shown) disposed between the drive shaft 106 of the motor 24 and the drum 25. The slip clutch also assures uniform movement of the carriage 40 and scanning means 21 on the rods 44.

Energization of the electric motor 24 is controlled by the switch 75 and the stop 92. Thus, when the carriage 40 reaches its limit position illustrated in dotted lines in FIG. 2, the plate 78 is moved to its dotted line position illustrated in FIG. 9 due to the arm 101 contacting the stud 98. The motor 24 is then energized to effect rotation of the drum 25 in a direction to shift the carriage 40 toward the outer or right end of the drum 19. At this same instant, closing of the switch 75 energizes the solenoid 66, as previously described, so that the chain 23 may pass freely through the groove 71. Adjustment of the stop 92 along the bar 93 thus controls the point at which the carriage 40 is caused to stop its longitudinal traverse toward the left or inner end of the drum 19 and to be shifted toward the right or outer end of the drum in preparation for another copying operation.

In addition to the foregoing, each time the solenoid 66 is energized, a stepping cam (not shown) is actuated. The stepping cam includes a switch in circuit with the motor 22 to shut off the latter when the cam has been actuated a predetermined number of times corresponding to the number of copies desired. Thus, on the last copy, when the plate is rocked to its full line position illustrated in FIG. 9 by contacting the stop 91, the solenoid 66 will be energized, thereby, uncoupling the carriage 40 from the chain 23 and deenergizing the motor 22.

Referring briefly again to FIG. 10, it will be observed that reflected light from the material being copied impinging on the photo-multiplier tube 47 results in the generation of a minute signal in the form of an electrical impulse. The magnitude of the impulse is a function of the intensity of the reflected beam of light from an elemental area of the material being copied. A series of such impulses from successive elemental areas of the rotating drum produces a varying voltage which is fed to the voltage current amplifier 30 to provide a similarly varying current between the helix wire electrode 28 and printer bar electrode 29. Such current effects electrolytic imprinting of a web of sensitized paper moving at a predetermined rate between the electrodes.

Because of the simplified and lightened construction of the scanning means 21 and particularly that of the light trap or scanner 50, a corresponding simplified and lightened construction may be employed in the conveyor structure. Thus, instead of employing an elongated screw type drive such as is usually employed in currently available facsimile copying machines, the present apparatus utilizes the ladder chain 23 and sprocket drive 58. Moreover, the use of the chain 23 also permits the use of the solenoid 66 to effect connection and disconnection of the carriage 40 and chain 23. It therefore becomes apparent that the simplified and lightened construction of the scanner 50 not only results in cost saving advantages in this unit but also permits of a substantial reduction in the cost the conveyor means and its related components.

Referring now to FIGURES 5 and 6 in conjunction with FIGS. 2 and 3, the reproducing means 14 will now be described. Such means comprises the printing drum 27 and electrodes 28 and 29. The helix wire electrode 28 is secured to the circumference of the printing drum 27 so that the former projects radially outwardly of the surface of the drum to a small extent and the wire 28 has an angular inclination such as to make one complete revolution around the periphery of the drum 27 throughout the length thereof. The helix wire electrode 28 receives the varying electrical current flow from the amplifier 30 by means of a slip ring and brush assembly 133, 134 (FIG. 3) disposed at the left or outer end of the drum 27.

Cooperating with the helix wire electrode 28 is the second electrode or printer blade 29 (FIGS. 6, 7, 8). The printer blade 29 is mounted on the door 13 and comprises a thin bar of stainless steel mounted at the ends of a plurality of longitudinally spaced generally vertically extending spring arms 137 (FIGS. 7 and 8). In the present instance, the blade 29 has a thickness of about .010 inch. The opposite ends of the spring arms 137 are secured to a rectangular bar or rod 138 having cylindrical end portions 139 which are journalled in bearing supports 141 carried at the edges of the door 13 and spaced inwardly from the door, as by support pads 140. The blade 29 is thus pivotable about the longitudinal axis of the bar 138.

In order to urge the blade 29 toward the printing drum 27 and helix wire 28 when the door is closed, the bar 138 includes a bracket 142 (FIGS. 7 and 8) secured to an outer flattened side face of the bar and extending outwardly away from the bar and toward the vertical wall of the door 13 (FIG. 6). The bracket 142 includes a pair of laterally spaced upstanding flanges 143 which are bored to receive a horizontally extending cylindrical rod or guide bar 144. The rod 144 is retained between a pair of laterally spaced blocks 146 secured to the wall of the door 13. An adjusting screw 147 having an enlarged head 148 and a threaded shank 149 is threaded into the guide rod 144 and serves to pivot the bracket 142 about the axis of the bar 138 and hence to control the biasing force exerted on the bar 29. A washer 151 and spring 152 carried on the shank 149 serve to maintain the screw 147 in an adjusted position. The front wall of the cover is provided with an enlarged opening 153 to accommodate pivotal movement of the screw 147 upon adjustment thereof.

Uneven wear of the contacting surface of the printer blade 29 is avoided by providing suitable means for oscillating or laterally shifting the blade 29 when the reproducing or printing portion of the machine is in operation. Thus, as best seen in FIGS. 5 and 7, the shaft 59 is provided with a cam 156 upon which a cam follower 157 rides. The cam follower 157 is carried at the outer end of an arm 158 that is pivotally secured, as at 159, at its inner end to a mounting plate 161 on the left side of the door 13. A link 162 in the form of a rod is secured at its upper end intermediate the ends of the arm 158, the lower end of the rod 162 being pivotally connected to a cam plate 163. The cam plate 163, which in the present instance has an elongated triangular shape, is pivotally connected, as at 164, to a mounting block 166 secured to a sidewall of the door 13. The free end of the cam plate 163 engages the end of one of the cylindrical portions 139 of the bar 138 in the manner illustrated in FIG. 7. A coil spring 167 is secured at one end to the bar 138 by a pin 168 connected to the bar, and the other end of the spring 167 is connected to a point rigid with the door, in this instance a member connected to the sidewall of the door. The spring 167 thus serves to maintain the end 139 of the bar 138 engaged with the triangular cam plate 163 for movement therewith. Rotation of the shaft 59 thus causes the printer blade 29 to oscillate in a direction transverse to that of the path of movement of the web of sensitized paper P. The life of the printer blade 29 is thus extended due to uniform wear.

The sensitized paper P utilized in the present copying apparatus is commercially available from various manufacturers and is designated as electrolytic copy paper or facsimile paper. Such papers are generally supplied in rolls and are impregnated with various electrolyte salts, such as calcium or sodium salts, and are maintained in a damp or moistened condition to facilitate the flow of current passing between the copy transcribing electrodes.

In the present instance, a roll of such paper, indicated at P, is mounted on a shaft 172 (FIGS. 2 and 6) in the reproducing portion of the machine and generally beneath the printing drum 27. The roll is mounted so that the free end thereof extends upwardly from the side of the roll adjacent the door 13. The paper P is thus threaded in the manner illustrated in FIG. 6 so as to pass over the outer side of a longitudinally extending guide plate 173 (FIGS. 2 and 6), the lower horizontal edge of the plate 173 being secured to a bar portion 170 pivotally mounted at its end in mounting blocks secured to the plates 17 and 18. The guide plate 173 is normally pivoted in a clockwise direction as viewed in FIG. 6, or away from the printing drum 27, so as to engage the web of paper and hold it out of contact with the drum except for the part thereof between the helix wire 28 and printer blade 29. Thus, the guide 173, which is of non-conducting material, assures only a line contact between the sensitized paper and the printing electrodes.

Upon passing between the electrodes 28 and 29, the web of paper P passes upwardly between a pair of idler rolls 174 and 176 carried by the plates 17–18 and the door 13, respectively, and thence over a heater plate 177 disposed above the rolls 174 and 176. The roll 176 is resiliently supported on spring mounts, indicated at 175 in FIG. 6. The heater plate 177 may be of any suitable heat conducting material, such as aluminum, and is heated from the rear surface thereof by means of a plurality of electrical heating elements 178 mounted in a channel 179 secured to the rear face of the plate 177. Temperature responsive means may be provided for controlling the temperature of the plates 177 and preventing scorching of the paper passing thereover.

A drive roller 181 (FIGS. 2 and 6) is mounted on the shaft 59 and is driven thereby to effect advancement of the web of paper through the reproducing portion of the machine. A pressure roll 182 is rotatably carried at the ends of a pair of arms 183 pivotally connected at their opposite ends in support blocks 184 carried by the door 13. An inverted L-shaped lever 185 is centrally pivotally mounted on the inner side faces of the plates 17 and 18 to provide a latch for holding the door 13 closed. Each lever 185 includes a generally horizontally extending arm 186 and a downwardly extending arm 187. The underside, indicated at 188, of the arms 186 is tapered for engagement over the annular bearing portions of the arms 183 which support the pressure roll 182. The surfaces 188 thus cam the arms 186 upwardly from their dotted line position to their full line positions illustrated in FIG. 6 as the roll 182 rides over the roll 181 to an over-center position as the door 13 is closed. A spring 189 connected to the lower end of each arm 187 tends to pivot the levers 185 toward their dotted line position illustrated in FIG. 6 to provide a latching action. Clockwise movement of the arms 187 is limited by a stop 191.

Thus, when the door 13 is moved toward a closed position, the roll 182 is initially cammed upwardly and over the roll 181 upon engagement therewith. As the roll 182 moves over the roll 181 toward its over-center position, the ends of the arms 183 engage the tapered undersurfaces 188 of the arms 186 and pivot them upwardly to their full line position illustrated in FIG. 6 against the force of the spring 189. The door 13 is thus held closed by the spring 189. The downward force of the spring 189 on the roll 182 also serves to hold the web of paper P in engagement with the roll 181 to permit the latter to advance the web upon rotation of roll 181. The diameter of the drive roll 181 is such that the web of sensitized paper will have a linear feed speed substantially equal to that of the longitudinal speed of traverse of the scanner 50.

After passing over the drive roll 181, the web of sensitized material containing the facsimile indicia thereon passes over the support rod 45 at the rear of the machine and thence to a receiving compartment (not shown). A window 190 may be provided in the door 13 of the machine to permit visual inspection of the copy as the sheet of material is progressing through the machine and to facilitate adjustment thereof as may be necessary to increase or reduce the contrast of the copy.

A pivotally mounted longitudinally extending brush 191 (FIGS. 3 and 6) is provided at the rear of the printing drum 27 to wipe particles of sensitized paper from the drum and particularly from the helix wire 28 to assure a good electrical contact. The brush 191 is urged into contact with the drum 27 by a spring 192 (FIG. 5) which engages a lever 193 secured to a shaft 194 on which the brush 191 is mounted.

While only one embodiment of the invention has been herein illustrated and described, it will be understood that modifications and variations thereof may be effected without departing from the scope of the invention as set forth in the appended claims.

I claim:

1. In a facsimile copying apparatus having a rotatable drum for supporting material to be scanned, an improved scanning means comprising a housing adapted to traverse the length of said drum and a light sensitive element in said housing, said housing including a light trap having a pair of minute openings in spaced alignment with said light sensitive element and the surface of said drum for directing reflected light in a restricted path from said drum through said openings onto said element.

2. The structure of claim 1, further characterized in that said openings have a diameter of from about .005 to about .015 inch.

3. The structure of claim 1, further characterized in that said light trap comprises an elongated tubular member extending from a wall of said housing, said tubular member having a straight bore of substantially larger diameter than said openings with the latter disposed at opposite ends of said bore.

4. The structure of claim 3, further characterized in that said tubular member has an internal diameter of at least about ten times the diameter of said openings and a length of at least one-half inch.

5. The structure of claim 3, further characterized in that said tubular member has a length of about 1.125 inches and an internal diameter of about .75 inch.

6. The structure of claim 1, further characterized in that said housing has a wall with an aperture therein, and said light trap comprises an elongated tubular member extending through said aperture with the inner end thereof disposed within said housing closely adjacent said light sensitive element and the outer end thereof disposed outside said housing closely adjacent the surface of said drum, said tubular member having an enlarged axial bore between said ends, and closure means at the ends of said bore defining said openings.

7. The structure of claim 6, further characterized in that said tubular member has an annular radially outwardly extending flange seating against said wall of said housing and the portion of said tubular member outside said housing is tapered.

8. In a facsimile copying apparatus, the combination of a rotatable drum adapted to receive material to be copied, scanning means mounted for movement parallel to the longitudinal axis of said drum, endless conveyor means having a portion thereof extending longitudinally of said drum, means for driving said conveyor means during rotation of said drum, and means for selectively connecting said scanning means to and disconnecting the same from said portion of said conveyor means.

9. The combination of claim 8, further characterized in that said last-named means comprises a solenoid mounted on said scanning means and having an armature normally engaging said portion of said conveyor means when said solenoid is deenergized, and means for energizing said solenoid in timed relation to movement of said scanning means for disengaging said armature from said portion of said conveyor means.

10. In a facsimile copying apparatus, the combination of a rotatable drum adapted to receive material to be copied, scanning means mounted for back and forth movement alongside said drum, drive means for moving said scanning means in one direction in timed relation to rotation of said drum to copy said material, return means for moving said scanning means in the opposite direction, and control means including a pair of longitudinally adjustable members adapted to be operatively engaged by said scanning means at opposite ends of its path of travel for selectively operating said drive means and said return means after said scanning means has travelled a predetermined distance in either direction.

11. The combination of claim 10, further characterized in that said return means includes means for resisting movement of said scanning means in said one direction to insure uniform movement thereof.

12. The combination of claim 11, further characterized in that said return means comprises a rotatably driven cable drum having a cable connected at one end to said cable drum, the other end of said cable being connected to said scanning means, and said means for resisting movement of said scanning means comprises a slip clutch interposed between said cable drum and its drive, said slip clutch providing resistance to unwinding of said cable when the drive for said cable drum is inoperative.

13. In a facsimile copying apparatus, the combination of a rotatable drum adapted to receive material to be copied, scanning means mounted for movement parallel to the longitudinal axis of said drum, said scanning means comprising a housing adapted to traverse the length of said drum and a light sensitive element in said housing, said housing including a light trap having a pair of minute openings in spaced alignment with said light sensitive element and the surface of said drum for directing reflected light in a restricted path from said drum through said openings onto said element, endless conveyor means having a portion thereof extending longitudinally of said drum, means for driving said conveyor means during rotation of said drum, and means for selectively connecting said scanning means to and disconnecting the same from said portion of said conveyor means.

14. A facsimile copying apparatus comprising a support, a rotatably driven shaft mounted on said support, a pair of elongated cylindrical drums mounted on said shaft in end-to-end relation, one of said drums being adapted to receive and retain a sheet of material having indicia thereon to be copied, a longitudinally shiftable carriage mounted on said support for movement alongside said one drum, a light-tight housing mounted on said carriage, a light sensitive element within said housing, a light trap in a wall of said housing, said light trap having a pair of minute openings in spaced alignment with said light sensitive element and the surface of said one drum for directing reflected light in a restricted path from an elemental area of said indicia to said element, said element providing signals which vary in magnitude as a function of the lightness or darkness of an elemental area being scanned, endless conveyor means for shifting said carriage in one direction, return means for shifting said carriage in the opposite direction, control means including a pair of longitudinally adjustable members for controlling the operation of said endless conveyor and said return means, adjustment of said longitudinally adjustable members controlling the length and position of the path of movement of said carriage relative to said one drum, and reproducing means including means associated with said other drum and responsive to the signals from said light sensitive element providing a facsimile copy of said indicia.

15. In a facsimile copying apparatus having a rotatable drum for supporting material to be scanned, an improved scanning means comprising, in combination, a housing adapted to traverse the length of said drum, a photomultiplier tube in said housing, a light source for generally illuminating said drum and the material supported thereon to be scanned, and a light trap carried by said housing and having a pair of minute openings in spaced alignment with said photomultiplier tube for directing reflected light in a restricted path from said drum through said openings onto said tube, whereby said light source may be of low intensity, due to the sensitivity of said photomultiplier tube, and need only flood the material on said drum to be copied.

References Cited by the Examiner

UNITED STATES PATENTS

| | | | |
|---|---|---|---|
| 2,354,571 | 7/1944 | Blain | 178—7.11 |
| 2,511,837 | 6/1950 | D'Humy | 178—6.6 |
| 2,564,572 | 8/1951 | Haynes | 178—6.6 |
| 2,712,611 | 7/1955 | Nyman | 250—219 |

DAVID G. REDINBAUGH, *Primary Examiner.*